July 15, 1969     W. S. BRIGGS ET AL     3,455,843
HYDROCARBON OXIDATION CATALYST
Original Filed May 8, 1964
WARREN S. BRIGGS — *INVENTORS*
WILLIAM A. STOVER
DONALD S. HENDERSON
BY Joseph P. Nigon
*ATTORNEY*

United States Patent Office 3,455,843
Patented July 15, 1969

3,455,843
HYDROCARBON OXIDATION CATALYST
Warren Stanley Briggs, Silver Spring, Md., William Albert Stover, Pitman, N.J., and Donald Stuart Henderson, Baltimore, Md., assignors to W. R. Grace & Co., New York, N.Y., a corporation of Connecticut
Original application May 8, 1964, Ser. No. 366,117, now Patent No. 3,288,558, dated Nov. 29, 1966. Divided and this application May 4, 1966, Ser. No. 562,019
Int. Cl. B01j *11/40*
U.S. Cl. 252—455                                                         4 Claims

ABSTRACT OF THE DISCLOSURE

A lead-temperature resistant hydrocarbon oxidation catalyst comprising a porous base impregnated with cupric oxide and palladium and having chromia deposited on the surface thereof. This catalyst is particularly suitable for oxidizing hydrocarbon components in auto exhaust streams.

---

This application is a divisional of Ser. No. 366,117, filed May 8, 1964, now U.S. Patent 3,288,558, which was a continuation in part of Ser. No. 197,916, filed May 28, 1962, now abandoned.

This invention relates to a novel internal engine exhaust catalyst and method of using same. In one particular embodiment it relates to a catalyst system having exceptional hydrocarbon conversion properties and increased resistance to the disintegration of the catalyst in the presence of lead compounds.

The problem of air pollution is not a new one. However, the problem has become aggravated in many cities in recent years. The air in most cities contains substantial quantities of both oxides of nitrogen and the products of incomplete combustion of organic fuels. In the presence of sunlight, photolysis of the oxides of nitrogen leads to the formation of measurable quantities of ozone. The ozone, in turn, reacts with various organic pollutants to form compounds which can cause the many undesirable manifestations of smog, such as eye irritation, visibility reduction and plant damage.

When meteorological conditions prevent the rapid dispersion of pollutants a smog condition results. Furthermore, it is now known that in many cities a major portion of organic pollutants are derived from unburner or partially burned gasoline in auto exhaust.

Another pollutant of much concern is carbon monoxide which is undesirable because of its toxic nature. This, too, is derived mainly from exhaust emissions.

Almost since the advent of the automobile and diesel engine powered vehicles, attempts have been made to solve the problem by rendering harmless and unobjectionable the noxious fumes which are the by-products of internal combustion engines. Various devices and filters using elementary catalytic materials, and since the 1920's, various modifications of filters and mufflers, have been designed in an attempt to solve this problem. To date, none have met with success complete enough for practical applications. One of the most difficult problems to overcome is the fact that although a given purification system appears to work initially, within a short period of time it becomes thoroughly contaminated and consequently useless. It does not seem feasible to install catalytic systems which must be periodically removed and rejuvenated because of the cost of such a system and such treatment.

Several investigators have realized that the only practical way to treat exhaust fumes to reduce hydrocarbon and carbon monoxide pollution is to oxidize the hydrocarbons to carbon dioxide and water and to oxidize the carbon monoxide to carbon dioxide.

A wide selection of oxidation catalysts has been produced in the past varying both in the chemical composition and physical structure. With respect to chemical composition, the ability of a wide variety of metals and metal oxides, either alone or in combination, to catalyze the complete oxidation of hydrocarbons has been noted.

To be sufficiently efficient in the removal of hydrocarbons and carbon monoxide from internal combusion engine exhaust gases and to meet the standards of maximum emission currently under consideration in the legislatures of the various states, the catalyst for treating exhaust gas must become efficient within a very few minutes after engine start-up and must maintain its activity throughout the various modes of engine operation. A catalytic converter must maintain its catalytic activity for a period of not less than one year and preferably for over 12,000 miles of engine operation. The problem of excessively high temperatures which are obtained when high concentrations of pollutants are being oxidized must also be solved in this system. It is not unusual for catalyst temperatures to reach 1600° F. or higher. A normal catalytic system cannot withstand prolonged exposure to these temperatures without thermal degradation of the catalyst.

In this connection, the problem of conversion of carbon monoxide at the low temperatures obtained in a catalytic muffler system at the start-up period of the engine operation is particularly troublesome. A catalyst must be active enough initially to be acceptable for use in an auto exhaust catalytic system. It is not sufficient that a catalyst will have a good activity after the engine is warmed up and the catalyst bed is at a temperature high enough to cause exhaust vapors passing through the bed to the oxidized to carbon dioxide and water.

The catalytic systems which have been devised to give satisfactory results for carbon monoxide conversion frequently suffers from relatively poor conversion of hydrocarbons. Since the ideal catalytic system gives a good conversion of both of these exhaust gas components, this problem is of prime importance.

An additional difficulty in the preparation of auto exhaust catalysts and the design of suitable mufflers for the integration of the exhaust catalyst into the conversion system is the problem caused by the presence of oxides of lead and particles of metallic lead in the exhaust. This lead results from the conversion of tetraethyl lead which is still the most commonly used gasoline anti-knock additive. In the preparation of gasolines, a quantity of tetraethyl lead is added to the gasoline at the refinery to impart anti-knock properties to the fuel. In addition to the tetraethyl lead, various compounds such as ethylene bromide, for example, are added, which convert the lead to volatile compounds which have an appreciable vapor pressure and are thus carried out of the engine into the exhaust system. The presence of these compounds causes problems with catalytic systems in that these lead salts, in addition to physically coating the individual catalyst particles, causes decreased attrition resistance by deterioration and break-down of these particles.

It is an object of this invention to provide a novel internal engine exhaust catalyst which, for the first time, makes catalytic conversion of exhaust gases practical.

It is another object of this invention to provide a novel internal combustion engine exhaust catalyst and method of use of such catalyst which provides excellent cold start activity, hot cycle activity, high conversion efficiency, superior attrition resistance, and improved resistance to lead fouling.

FIGURE 1 is a cross-sectional view of an extrudate of this invention.

The composition of this invention comprises a porous base having the shape of a nodule, pill, or extrudate, impregnated with palladium, copper oxide, and chromia.

The porous base may comprise alumina, silica-alumina, silica-magnesia, zirconia, zirconia-alumina, zirconia-magnesia, etc., in the shape of a nodule, pill, or extrudate. The size of the base can be within the range of about from 3 to 10 mesh (Tyler Standard Screen) and is preferably within the range of about from 5 to 8 mesh. Particularly good results have been obtained with a gamma-type alumina base having the preferred size range.

The base is impregnated with from about 2 to 20 percent cupric oxide and from about 0.0025 to 0.4 percent palladium by weight.

The base is impregnated with sufficient chromina to provide from 1 to 12 percent chromia based on the total weight of the impregnated base in the outer 50% by volume of the base. The preferred range of chromina in the outer volumetric 50 percent of the base is from 2 to 5 percent. Higher chromia concentrations in the outer portions of the base provide little further benefits in efficiency. The optimum chromia concentration is about 4 percent. Chromia impregnation throughout the base is sometimes unavoidable, particularly when highly soluble chromium salts in which the chromium is present as a cation are employed as impregnants. However, no significant impairment of the catalyst efficient has been found to occur when complete base impregnation occurs.

The composition of this invention has excellent cold start activity with hydrocarbon conversion efficiency which does not lag behind carbon monoxide conversion. In addition to this improved hydrocarbon conversion, resistance of the catalyst to lead deterioration is remarkable.

The lead deposits, primarily lead sulfate and basic lead sulfate are formed in the outermost volumetric portion of the catalyst particle. Porosity of the catalyst is retained, even after prolonged use, as evidenced by a continued oxidation activity.

The composition of this invention is formed by impregnating the base or support material with a cuprous salt-amine tartrate-palladium solution. The cuprous salt and palladium salts are present in an amount sufficient to impregnate the final catalyst with from about 2% to 20% cupric oxide and with from about 0.0025 to 0.4 weight percent palladium. Any one or more of the known cuprous salts can be used in preparing these catalysts. Such salts include, for example, cuprous bromide, cuprous carbonate, cuprous chloride, cuprous cyanide, cuprous fluoride, cuprous sulfide, cuprous sulfite, cuprous thiocyanate, cuprous oxide, etc. Because of its ready availability and comparatively low cost, the preferred cuprous salt is cuprous chloride.

The chloride is then mixed with various agents that will form a soluble cuprous product in the concentration range desired for the preparation of the catalyst. This involves the addition of both the ammonia or amine complexing agent together with certain hydroxy acids or certain of the higher alcohols.

Suitable amines or other nitrogen compounds which can be used in the preparation of the catalyst include the short chain primary amines having from 1 to 5 carbon atoms and ammonia. The cyanide complex may also be used in that it forms a soluble cuprous complex. The hydroxy acids include citric, hydroxy-acetic, tartaric, etc. Tartaric acid is the preferred complexing acid. Certain alcohols such as sorbitol, for example, also give satisfactory results.

After the cuprous amine tartrate complex has been prepared, a solution of a palladium salt is added to the solution. Suitable palladium salts include palladium bromide, palladium chloride, palladium fluoride, palladium nitrate, palladium sulfate, etc. The mixture is then used to impregnate the base. The amount of aqueous impregnation solution used in this stage of the preparation is not critical. A suitable impregnation can generally be made by using from about 40 to 50 ml. of the impregnating solution per 100 grams of catalyst base. The impregnating solution should contain sufficient copper to deposit from about 2 to about 20% copper oxide on the base. It should also contain sufficient palladium to deposit up to about 0.1 weight percent, preferably from about 0.0025 to 0.04 weight percent palladium on the base.

After the copper-palladium impregnation step is complete, the impregnated material is dried in the presence of steam, air, or mixtures of air and steam at a temperature of about 260° F. After the catalyst is dried in this manner, it is impregnated with a chromium salt to give the proper concentration of chromia ($Cr_2O_3$) in the outer volumetric area. This chromia can be deposited on the catalyst particles using various materials and various techniques. Vacuum impregnation gives suitable results. With this technique the choice of the chromium salt is not particularly critical. The only limitation on the choice of salt is the requirement that the salt must be sufficiently soluble to give the desired chromia concentration in the final catalyst. Chromic acid, chromium acetate and ammonium chromate are the preferred sources of chromia. Other chromium salts suitable for this impregnation include ammonium dichromate, chromium nitrate, chromium chloride, chromium sulfate, etc.

When an impregnant is employed using an anionic chromium such as ammonium chromate, it is relatively easy to obtain the desired chromia concentration in the outer 50 volume percent of the base since the chromium ion is selectively adsorbed on the base. When the base is impregnated with a highly soluble chromium such as chromium nitrate, multiple impregnations may be necessary to obtain the higher concentration in the outer portion of the base. After the chromium compound is impregnated on the base, the catalyst particles are heated to about 1400° F. in an atmosphere of air, steam, or a mixture of air and steam.

FIGURE 1 is a cross-sectional view of an extrudate of this invention at a magnification of about ×28. The total chromia deposited on the alpha-alumina base shown was about 4 percent, and appears in the photograph as the darkened area. Practically all of the chromia in this particular example lies in the outer 50 percent by volume of the base, and therefore the requisite chromia concentration in that area is provided. The larger pits were caused by the grinding operation employed to prepare the sample for reproduction, and the porosity characteristic of the product is illustrated by the uniformly irregular surface in the photograph. When chromia deposition is primarily in the outer volumetric portion of the base, as in the example in the figure, a ring appearance is present, i.e., the "chromia ring."

The active catalyst prepared according to this invention shows remarkably good activity for hydrocarbon conversion at low temperatures. Lead resistance of this catalyst is also improved, primarily because of the presence of the chromia ring.

The attrition resistance of the catalyst particles was determined in a test which utilizes an air jet stream to transfer individual granules against the wall of the containing vessel at relatively constant velocity, and hence, high energy or impact. The impact causes slow degradation of the particles, the rate depending on the attrition properties of the particular catalyst.

A sample of exactly 10 grams is placed in a one liter Erlenmeyer flask with a one inch diameter opening out through the bottom which opening is covered with a screen. An inverted brass funnel with a mouth size about the same size as the internal diameter of the neck of the flask is inserted in the mouth of the flask through a rubber stopper. A constant known air source, of approximately 7.7 standard ft.³/min., is directed into the funnel. With the Erlenmeyer flask in an inverted position and the sample resting on the screen over the funnel, the air jet causes the granules to be bombarded against the top and sides of the flask. The superficial linear velocity of the air at the funnel stem is in excess of 400 ft./sec. As the particles attrite, dust from the attrition is carried away by a vacuum. A 10 gram sample of 5 to 8 mesh catalyst particles contains about 800 granules so that the sample is representative.

The air rate into the flask is kept constant by holding the pressure of the supply at 38 lb./in.$^2$. The attrition is carried on for a period of thirty minutes. After the test is completed, the sample is screened through a 12 mesh screen. The percentage attrition is defined as the percentage of material not retained on a 12 mesh screen. The mesh of the screen is varied in determining the attrition of smaller and larger particles.

The activity index of the catalyst for either carbon monoxide or hydrocarbon conversion is determined by measuring the area under an activity curve in the range of the average catalyst temperature, 350–850° F., and calculating what percentage this area constitutes of the area under the "ideal" activity curve. "Ideal" activity is defined as 100% conversion throughout this temperature range. Thus the activity index may vary from 0 which indicates no activity to 100% which would indicate so-called "ideal" activity.

The evaluation of our catalyst and the demonstration of the new and unexpected results obtained when our catalyst is used in an auto exhaust conversion system is made using the test procedure described in detail in "California Procedure for Testing Motor Vehicle Exhaust Emissions" published by the Motor Vehicle Pollution Control Board in May 1961 with an addendum, dated Feb. 1, 1962.

Very briefly, this system consists of aging the catalyst by driving an automobile using leaded gasoline with a suitable muffler containing the catalyst and a pump to supply air, over the road for varying periods of time. The vehicle is brought in periodically (1000 to 2000 miles) and run through dynamometer tests described in the publication cited above.

Two types of cycles are used in the operation of the chassis dynamometer testing. The first is the 7-mole warm-up cycle of 2 minutes and 17 seconds duration. The second type of cycle is an 11 mode hot cycle of 4 minutes and 39 seconds duration. In each of these tests transition modes are included. Outlet emissions from the catalytic converter are measured in consecutive and continuous warm-up cycles followed by one hot cycle. This test is carried out starting with a cold engine which has not been operated for at least 12 hours. The duration of this test is 18 minutes and 21 seconds and is designed to be representative of an "average" trip in a metropolitan area from a cold engine start. Emissions of hydrocarbons, carbon monoxide and carbon dioxide are measured by non-dispersive infra-red analysis throughout the test.

Data from each mode of the first four warm-up cycles and a hot cycle are averaged, corrected for air dilution variations, and weighed to give single average values for hydrocarbons and carbon monoxide during the warm-up phase and during the hot cycle. A final "combined" value for the device is determined by combining 35% of the warm-up cycle emissions and 65% of the hot cycle emissions. The invention is further illustrated by the following but non-limiting examples:

Example I

A general method of preparing the catalyst of our invention is as follows:

The impregnating solutions were prepared from commercially available chemicals. The copper amine tartrate solution was prepared by weighing out 40 grams of cuprous chloride and 48 grams of tartaric acid. The cuprous chloride-tartaric acid mixture was added to a covered flask and 1120 ml. of concentrated ammonium hydroxide solution. (28% $NH_3$) was added to the mixture with stirring for a period of about 1 hour. The cuprous amine tartrate solution weighed 1515 grams and had a density of 1.235 grams per ml. The solution contained 0.315 grams of cuprous oxide per ml. (calculated).

Prior to impregnation of the base, sufficient palladium as 10% palladium nitrate solution was added to the cuprous amine tartrate solution to yield a CuO to Pd weight ratio from 50 to 1 to 10 to 1.

In preparing the catalyst, 185 grams (180 grams dry basis) of nodules of commercial alumina monohydrate were contacted with 92 ml. of the cuprous amine tartrate-palladium solution. Sufficient solution was added to saturate the nodules but leave the surface essentially dry. The impregnated base was then dried for 16 hours at 260° F. At this point, the impregnated base contained sufficient metal to yield a finished product containing 10% by weight CuO and 0.02% by weight palladium. The chromia was then added to the nodules containing copper and a palladium using the following techniques:

A total of 285 grams of dried catalyst, prepared according to the technique described above, was transferred to an open dish and a total of 40 ml. of a chromic acetate solution containing the equivalent of 0.333 gram of chromic oxide per ml. which had been diluted with deionized water to 140 ml. was added. The catalyst and solution mixture was transferred to a glass vessel which was equipped to release the steam generated slowly and the mixture was heated to 1000° F. for a period of 3 hours in its own atmosphere. At the end of this period essentially all of the water had vaporized from the catalyst mixture, and the mixture was calcined for 3 hours at 1400° F.

The final product contained 10 weight percent copper oxide, 0.02 weight percent palladium and 3 weight percent chromia. Almost the entire amount of chromia in the base was found to be concentrated in the outermost 50 percent of the volume of the base.

Example II

An alternate method of preparing this catalyst was evaluated and found to give satisfactory results. The copper-palladium catalyst on the nodules of alumina monohydrate was prepared using the technique described in Example I and it contained 10% copper oxide and 0.02% palladium.

A total of 285 grams of this material was weighed out and impregnated with chromia using the alternate technique. A total of 45 ml. of a chromic acetate solution containing the equivalent of 0.333 gram of chromium oxide per ml. was diluted to 130 ml. with deionized water. The 285 gram charge of impregnated nodules was placed in a suitable vessel and the vessel evacuated to about 1 to 10 centimeters of water. The chromic acetate solution was added to the vessel, and on completion of the addition, the nodules containing the solution were transferred to a vessel designed so that a large percentage of the water, which would normally be evolved as steam when the wet nodules were heated, would be kept in contact with the catalyst mass as it was heated. The mixture was then heated in this vessel for 3 hours at 1000° F. At the end of this period the catalyst was calcined for a period of 3 hours at 1400° F.

The final catalyst contained 10% copper oxide, 0.02% palladium and 5% chromia as $Cr_2O_3$ by weight. A microscopic examination of the product showed that each of the nodules had a well defined ring of chromia in the outer volumetric portion of the base. Therefore, about 5% chromia impregnant was present in the outer portion.

Example III

Still another method of preparing this catalyst was devised. In this method, the support was a commercial alumina monohydrate in the form of nodules of from 5 to 8 mesh. The nodules were impregnated with a cuprous amine tartrate-palladium solution using the technique described in Example I. The impregnated nodules were then dried in a stream of air at a temperature of 260° F. for a period of about 16 hours. At the end of this time the materials were reimpregnated with ammonium chromate $(NH_4)_2CrO_4$. After the impregnation, the catalyst was again dried at a temperature of 260° F. in a stream of air. The dried catalysts were charged to a cold muffle furnace and heated to a temperature of 1400° F. in an atmosphere of air for a period of about 3 hours.

The catalysts prepared by the techniques described in Examples I, II and III can be prepared to contain 5 to 20 weight percent copper oxide, 0.01 to 0.1 weight percent palladium and 1 to 10 weight percent chromia.

Example IV

The greatly superior performance of the novel catalyst of our invention was shown by comparing the catalyst prepared by any of the methods described in Examples I, II and III with a catalyst which contained no chromia. These catalysts were evaluated by determining the percent conversion of a mixture containing 3.85% carbon monoxide, 1000 parts per million of normal hexane, 10% water and 4.5% oxygen, the balance being nitrogen.

The gases were passed through the catalyst at a gaseous hourly space velocity of 5000 volumes of gas per volume of catalyst per hour. The greatly superior results obtained with the catalyst containing the requisite chromia concentration in the outer volumetric portion (or chromia ring) are shown in Table I.

TABLE I.—CONVERSION AT 450° F. FOR CO AT 750° F. FOR HYDROCARBONS

| | | |
|---|---|---|
| Weight percent chromia | 0.0 | 4 |
| Percent conversion of carbon monoxide | 100 | 100 |
| Percent conversion of hydrocarbon | 75 | 95 |

These data clearly demonstrate that the conversion for carbon monoxide is excellent at low temperature (450° F.). The conversion of hydrocarbons at 750° F. is increased from 75 to 95 by the addition of as little as 4% chromia.

Example V

The effect of the chromia concentrations was shown in a series of runs in which the chromium ($Cr_2O_3$) content was varied from 2 to 8%.

In each of these runs the chromia was impregnated on nodules of alumina monohydrate which had been previously impregnated with 10% copper oxide and 0.02% palladium. The catalyst was prepared using the technique described in Example II. The vacuum impregnation was carried out using sufficient chromium acetate to produce a catalyst with a final chromia ($Cr_2O_3$) concentration of about 2.0, 4.0 and 8.0 in the outer 50% by volume of the base.

The catalysts were evaluated by determining the percent conversion of a mixture containing 3.85% carbon monoxide, 1000 parts per million of normal hexane, 10% water and 4.5% oxygen, the balance being nitrogen. The materials were passed through the catalysts at a gaseous hourly space velocity of 5000 volumes of gas per volume of catalyst per hour. The attrition index was determined using the air jet attrition method previously described. The data collected is presented in the table below.

TABLE II

| | | | |
|---|---|---|---|
| Percent $Cr_2O_3$ | 2.0 | 4.0 | 8.0 |
| Attrition, percent loss | 6 | 2 | 14 |
| Percent conversion CO at 450° F | 100 | 100 | 95 |
| Percent conversion hydrocarbon at 650° F | 68 | 75 | 30 |
| Percent conversion hydrocarbon at 750° F | 96 | 98 | 91 |

It is apparent from an examination of these data that the optimum concentration of $Cr_2O_3$ is between about 3 and 5%. The catalyst containing 4% chromia had an improved attrition resistance and the best carbon monoxide and hydrocarbon conversion of the 3 catalyst. Increasing the chromia content to 8.0% increases the attrition index slightly.

Example VI

A series of runs was completed to investigate the effect of the size of the alumina nodules and the effect of calcining the nodules before the catalyst preparation steps.

In each of these preparations, the catalyst was prepared to contain 10% copper oxide and 0.02% palladium using the technique described in Example I. The second step, reimpregnation, was completed using ammonium chromate in an amount sufficient to produce a catalyst containing 4% chromia as $Cr_2O_3$. After the preparation was complete the catalyst was calcined in each case for a period of 3 hours at 1400° F. The activity indices were computed using the method previously described above. The activity for carbon monoxide and hydrocarbon conversion at 450°, 650° and 750° F. was determined using the techniques described in the previous examples. The data collected in this series of runs is presented in the table below.

TABLE III

| | Size of support nodule | | | |
|---|---|---|---|---|
| | 5-8 mesh | 8-10 mesh | 5-8 mesh | 8-10 mesh |
| | Pre-treatment of base | | | |
| | None | None | Calcined for 1 hour at 1,000° F. | |
| Activity index: | | | | |
| Hydrocarbon | 45 | 50 | 34 | 43 |
| Carbon monoxide | 100 | 100 | 99 | 100 |
| Conversion in percent: | | | | |
| CO at 450° F | 100 | 100 | 99 | 100 |
| Hydrocarbon at 650° F | 60 | 69 | 35 | 63 |
| Hydrocarbon at 750° F | 93 | 100 | 86 | 93 |

It is apparent from a review of these data that a suitable catalyst can be prepared using either 5 to 8 mesh or 8 to 10 mesh nodules. Calcination of the catalyst base for a period of one hour at 1000° F. had no appreciable effect on the conversion of the catalyst.

Example VII

Vacuum impregnation was evaluated in a series of runs in which the catalyst prepared in the vacuum technique and direct impregnation technique were compared, as to attrition loss and activity.

In each of these runs, the catalyst was prepared to contain 10% copper oxide, 0.02% palladium and 2 to 4% chromia, ($Cr_2O_3$). The catalysts were prepared using the techniques described in the previous examples, and after the second impregnation, the catalyst was heated in an atmosphere of the steam evolved for a period of 3 hours at 1000° F. followed by a calcination for 3 hours at 1400° F. The chromia concentration in the outer 50 volume percent of the particle constituted almost all of the chromia impregnant employed since the chromia was visible on the base in cross-section as a ring. Therefore, the total $Cr_2O_3$ values given correspond approximately to the $Cr_2O_3$ content of the outer portion of the particle. The attrition indices were determined using the air jet attrition method. The method of determining the activity index, carbon monoxide and hydrocarbon conversion has been described above. The data collected in this series of runs is presented in Table IV.

TABLE IV

| Method of impregnation | Vacuum | | Atmospheric | |
|---|---|---|---|---|
| Percent chromia as $Cr_2O_3$ | 2.0 | 4.0 | 2.0 | 4.0 |
| Attrition in percent | 21 | 15 | 21 | 20 |
| Activity index: | | | | |
| Carbon monoxide | 100 | 100 | 100 | 100 |
| Hydrocarbon | 39 | 42 | 33 | 38 |
| Conversion in percent: | | | | |
| CO at 450° F | 100 | 100 | 100 | 100 |
| Hydrocarbon at 650° F | 41 | 52 | 28 | 43 |
| Hydrocarbon at 750° F | 88 | 95 | 81 | 91 |

The data collected in these runs indicate there is no outstanding advantage in vacuum impregnation over the conventional solution impregnation techniques. The activity of the catalyst increases with increased chromia content as in the previous run. The attrition loss is essentially the same in all cases. The hydrocarbon and carbon monoxide conversion indicates that a suitable catalyst can be prepared using either of these techniques.

Example VIII

A series of runs were completed in which the catalysts were prepared using a slightly different technique. This run shows the advantage of using chromic acid as the impregnant.

In this series of runs the catalyst was prepared using the vacuum impregnation technique. In the first step a quantity of the support (181 grams) was vacuum impregnated with a chromic acid solution containing 7.9 grams of chromia. The vacuum impregnation was continued for a period of time sufficient to cause the chromia to diffuse through the nodules. After the chromia impregnation was complete the nodules were heated at 260° F. in a stream of air for a period of 3 hours and then reimpregnated using 92 ml. of a solution containing the equivalent of 0.3 gram of copper oxide and 0.0076 gram of palladium per ml. solution. After this reimpregnation, the catalyst was heated to a temperature of 260° F. in a current of air for a period of about 15 hours. It was then calcined for 3 hours at 1000° F.

The attrition indices were determined using the air jet attrition method as in the previous examples. The activity index of the catalyst is reported below.

TABLE V

| | | | |
|---|---|---|---|
| Percent $Cr_2O_3$ | 0.0 | 3.0 | 5.0 |
| Attrition, percent loss | | 14 | 10 |
| Activity index: | | | |
| CO | 100 | 79 | 92 |
| Hydrocarbon | 30 | 47 | 51 |

It is apparent from an examination of these data that a suitable catalyst can be prepared using this technique. As in the previous example, the catalyst prepared to contain the higher $Cr_2O_3$ concentration has the best properties. The 5% sample of this example corresponds most closely to the 2% sample in the previous example in terms of $Cr_2O_3$ concentrations in the outer proportion. When the activity indices of this catalyst are compared with the activity indices of the catalyst prepared according to the technique described in Example VII the advantage of having the chromia concentration of about 4% in the outer 50 percent of the base by volume is apparent.

Example IX

A series of runs were completed to determine the effect of a calcination step after the completion of the copper-palladium impregnation step in the process and prior to the chromia impregnation.

In each of these experiments the support was alumina monohydrate as nodules of 6 to 8 mesh size. The support was calcined for 1 hour at 1000° F. followed by impregnation with the copper amine tartrate palladium solution to yield a product containing 10% CuO and .02% palladium. The catalyst was then dried at 260° F. as in Example I. In some of these preparations the catalysts, at this point, were calcined for one hour at 1000° F. In each case the chromia was added as chromic acetate and by the vacuum impregnation technique. Then the catalyst was calcined for 3 hours at 1400° F. The properties of the catalysts and the conversion values are set forth in the table below.

TABLE VI

| | Treatment after copper-palladium impregnation | | | | |
|---|---|---|---|---|---|
| | Calcined 1 hour at 1,000° F. | | | Dried at 260° F. | |
| Percent chromia as $Cr_2O_3$ | 2 | 4 | 6 | 2 | 4 |
| Attrition, percent wt. loss | 15 | 9 | 10 | 14 | 18 |
| Conversion in percent: | | | | | |
| CO at 450° F | 100 | 99 | 97 | 100 | 100 |
| Hydrocarbon at 650° F | 31 | 31 | 40 | 29 | 19 |
| Hydrocarbon at 750° F | 76 | 78 | 86 | 76 | 77 |

The data set out above clearly indicates that a suitable catalyst can be prepared to contain 10% CuO and 0.02% palladium and 2, 4 and 6% chromia. The calcination of the catalyst after the copper-palladium impregnation step has no marked effect on the conversion properties of the catalyst.

Example X

The improved lead-temperature resistance of the chrome-containing auto exhaust catalyst was demonstrated in a series of runs in which this catalyst was compared to a similar catalyst not containing chromia (i.e., 10% copper oxide—0.02% palladium). Lead bromide was used for the accelerated leading technique. Here, 10% lead was volatilized onto the catalyst at a temperature of 1400° F. for a period of one hour. Lead bromide was chosen because it is the most volatile lead compound that could be present in auto exhaust gases from fuels containing tetraethyl lead. This compound, because of its volatility, can penetrate the catalyst more deeply and cause more severe deactivation due to lead. Lead bromide is formed in the automobile engine by the reaction of tetraethyl lead with ethylene bromide. The halides (bromides and chlorides) are added to the TEL concentrate specifically to scavenge the lead compounds into the exhaust systems.

In addition to resistance to lead poisoning, the catalyst should be able to withstand temperatures as high as 1400° F. The leaded catalysts were then evaluated after being treated for 16 hours at 1400° F.

The data collected in this series or runs is shown in the table below.

TABLE VII

| | With the chromia ring | Without chromia |
|---|---|---|
| Percent CO conversion at 450° F., average catalyst temperature | 16 | 0 |
| Percent hydrocarbon conversion at 650° F., average catalyst temperature | 11 | 0 |
| Percent hydrocarbon conversion at 750° F., average catalyst temperature | 30 | 0 |
| Activity index, CO | 60 | 44 |
| Activity index, hydrocarbon | 15 | 0 |

These data clearly illustrate that the lead treatment and calcination at 1400° F. for 16 hours essentially deactivated the catalyst which contained no chromia. The decrease in the activity after heat-treatment is shown by comparing the activity indices in columns 1 and 2 in the table.

Example XI

The essence of the invention covered in the instant application resides in the excellent aging characteristics of the catalyst of this invention.

In this example, the catalyst was gamma-alumina nodules impregnated with 10 percent cupric oxide, 0.02 percent palladium, and having a chromia impregnant concentration of about 4 percent in the outer 50 volumetric percent of the base, all percents being based on the total weight of the catalyst particle.

The catalyst was aged in a muffler attached to an automobile driven over a 200 mile route. The driving mode was controlled so that 75% of the mileage was accumulated as what would be considered "typical" city and suburban driving. The other 25% was accumulated as high speed freeway driving.

The aging performance data was collected using the method described in detail in the California procedure publication referred to previously and summarized in the specification of the instant application.

The data was collected using a typical high test gasoline having the following properties:

| | |
|---|---|
| Gravity, ° A.P.I. | 57.5 |
| Reed vapor pressure (p.s.i.g.) | 9.8 |
| Sulphur (weight percent) | 0.04 |
| Olefins (volume ± percent) | 11.3 |
| Bromine number | 24.1 |
| Octane number (F-1) | 100.3 |
| Tetraethyl lead (ml./gal.) | 2.93 |

The test vehicle was a 1962 Chevrolet with a V-8 engine using 14 lb. 7 oz. catalyst. The aging performance data is shown in Table VIII.

TABLE VIII.—AGING PERFORMANCE DATA

| Mileage | Combined value inlet | | Warmup and hot cycle outlet | | Conversion efficiency in percent | |
|---|---|---|---|---|---|---|
| | HC | CO | HC | CO | HC | CO |
| 94 | 394 | .76 | 46 | .03 | 88 | 96 |
| 1,313 | 407 | .80 | 83 | .16 | 80 | 80 |
| 3,292 | 318 | .79 | 125 | .21 | 61 | 73 |
| 6,170 | 447 | .90 | 207 | .40 | 54 | 44 |
| 9,260 | 416 | 1.02 | 261 | .47 | 37 | 54 |
| 12,039 | 468 | .80 | 318 | .46 | 35 | 49 |

In this table the hydrocarbon (HC) values in the inlet and outlet columns are expressed in parts per million. The carbon monoxide (CO) values are expressed in percent. It is apparent from an examination of this data, especially the efficiency of the conversion, that a high activity of the catalyst for hydrocarbon conversion is retained at 12,000 miles. The carbon monoxide and hydrocarbon conversion factors remain well within the desired levels over this period of time.

Example XII

This example shows further tests using the catalyst of Example XI with a variety of automobile engines under essentially the same road test conditions. The results are shown in Table IX.

In this table the hydrocarbon (HC) values in the inlet and outlet columns are expressed in parts per million. The carbon monoxide (CO) values are expressed in percent. It is apparent from an examination of this data, especially the efficiency of the conversion, that a high activity of the catalysts for hydrocarbon conversion is retained at 12,000 miles with the catalyst having the requisite chromia concentration in the outer 50 percent by volume of the particle. The carbon monoxide and hydrocarbon conversion factors remain well within the desired levels over this period of time.

We claim:

1. A novel internal combustion engine exhaust catalyst comprising a porous base selected from the group consisting of alumina, silica-alumina, silica-magnesia, zirconia, zirconia-alumina, and zirconia-magnesia having a particle size within the range of from about 3 to 10 Tyler mesh, said base being impregnated with from about 2 to 20 weight percent cupric oxide, from about 0.0025 to 0.4 weight percent palladium, and chromia, the outer 50 percent by volume of the base particle containing from 1 to 12 weight percent chromia based on the total particle weight.

2. The composition of claim 1 wherein the base is gamma-alumina.

3. The composition of claim 1 wherein the base is gamma-alumina in nodular form.

4. The composition of claim 1 wherein the particle size of the base is from about 5 to 8 Tyler mesh.

TABLE IX.—AGING PERFORMANCE DATA

| Test No. | Mileage | Combined value inlet | | Warmup and hot cycle outlet | | Conversion efficiency in percent | |
|---|---|---|---|---|---|---|---|
| | | HC | CO | HC | CO | HC | CO |
| 1[1] | 1,586 | 696 | 2.02 | 105 | 0.31 | 85 | 85 |
| 1 | 3,546 | 542 | 2.23 | 190 | 0.77 | 65 | 65 |
| 1 | 9,532 | 567 | 2.16 | 308 | 1.30 | 46 | 40 |
| 1 | 12,112 | 724 | 1.08 | 380 | 0.58 | 48 | 46 |
| 2[2] | 66 | 485 | 0.78 | 117 | 0.68 | 76 | 13 |
| 2 | 3,176 | 404 | 1.51 | 198 | 0.53 | 51 | 65 |
| 2 | 6,006 | 464 | 1.19 | 269 | 0.64 | 42 | 46 |
| 2 | 9,296 | 461 | 1.32 | 258 | 0.61 | 44 | 54 |
| 2 | 11,291 | 497 | 1.19 | 283 | 0.54 | 43 | 55 |
| 2 | 15,163 | 695 | 1.44 | 239 | 0.62 | 66 | 57 |
| 3[3] | 236 | 527 | 1.52 | 101 | 0.13 | 74 | 76 |
| 3 | 3,743 | 674 | 1.20 | 233 | 0.51 | 62 | 42 |
| 3 | 6,103 | 664 | 1.23 | 247 | 0.48 | 60 | 44 |
| 3 | 9,322 | 815 | 1.47 | 387 | 0.50 | 52 | 53 |
| 3 | 12,155 | 411 | 1.23 | 225 | 0.45 | 41 | 46 |
| 4[4] | 83 | 393 | 1.56 | 71 | 0.16 | 82 | 50 |
| 4 | 2,955 | 487 | 1.73 | 190 | 0.70 | 61 | 60 |
| 4 | 6,300 | 488 | 1.61 | 268 | 0.84 | 45 | 48 |
| 4 | 8,947 | 462 | 1.67 | 287 | 1.10 | 38 | 34 |
| 4 | 11,988 | 366 | 2.39 | 277 | 1.85 | 24 | 23 |

[1] Test car was a Chevrolet V-8 truck using 15 lb. 1 oz. catalyst.
[2] Test car was a Ford V-8 car using 14 lb. 6 oz. catalyst.
[3] Test car was a Chevrolet 6 cylinder car using 14 lb. 13 oz. catalyst.
[4] Test car was a Chevrolet V-8 car using 14 lb. 6 oz. catalyzt.

References Cited

UNITED STATES PATENTS 3,133,029   5/1964   Hoekstra   252—466
3,224,981   12/1965   Stephens et al.   252—466 X
3,271,324   9/1966   Stephens et al.   252—466

DANIEL E. WYMAN, Primary Examiner

C. F. DEES, Assistant Examiner

U.S. Cl. X.R.

252—458, 460, 465, 466, 477